United States Patent
Liu et al.

(10) Patent No.: US 10,048,521 B2
(45) Date of Patent: Aug. 14, 2018

(54) LIQUID CRYSTAL PHOTO-ALIGNMENT DEVICE

(71) Applicant: SHENZHEN CHINA STAR OPTOELECTRONICS TECHNOLOGY CO., LTD., Shenzhen, Guangdong (CN)

(72) Inventors: Xiaocheng Liu, Guangdong (CN); Wen-Pin Chiang, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 213 days.

(21) Appl. No.: 14/777,127

(22) PCT Filed: Jan. 17, 2014

(86) PCT No.: PCT/CN2014/070850
§ 371 (c)(1),
(2) Date: Oct. 1, 2015

(87) PCT Pub. No.: WO2015/089931
PCT Pub. Date: Jun. 25, 2015

(65) Prior Publication Data
US 2016/0291355 A1     Oct. 6, 2016

(30) Foreign Application Priority Data

Dec. 20, 2013     (CN) .......................... 2013 1 0714158

(51) Int. Cl.
*A46B 9/00*     (2006.01)
*B08B 1/00*     (2006.01)
(Continued)

(52) U.S. Cl.
CPC .............. *G02F 1/1303* (2013.01); *A46B 9/00* (2013.01); *B08B 1/002* (2013.01); *B08B 1/008* (2013.01);
(Continued)

(58) Field of Classification Search
CPC ........... A46B 9/00; B08B 1/002; B08B 1/008; B08B 5/00; B08B 5/02; B08B 7/0057;
(Continued)

(56) References Cited

U.S. PATENT DOCUMENTS

2009/0092761 A1* 4/2009 Ishida ................... G02F 1/1303
427/421.1

FOREIGN PATENT DOCUMENTS

CN     102914912 A     2/2013
CN     103163689 A     6/2013
(Continued)

OTHER PUBLICATIONS

Yulin Li, The International Searching Authority written comments, Jul. 2014, CN.

*Primary Examiner* — Levon J Shahinian

(57) ABSTRACT

The present invention discloses a liquid crystal photo-alignment device. The liquid crystal photo-alignment device includes two parallel guide rails, a platform sandwiched between the two guide rails, a support assembly slidably mounted on the two guide rails, and a cleaning assembly mounted to the support assembly. The platform has a supporting surface for supporting a LCD panel. Each support assembly includes a supporting beam across the platform, two supporting arms extending from opposite ends of the supporting beam, and two sliders connected to the respective supporting arms. The sliders are slidably mounted in the guide rails. The cleaning assembly faces toward the platform and is configured to clean up foreign objects on the platform.

16 Claims, 4 Drawing Sheets

(51) Int. Cl.
    *B08B 5/00*     (2006.01)
    *B08B 5/02*     (2006.01)
    *B08B 7/00*     (2006.01)
    *B08B 7/02*     (2006.01)
    *B08B 15/00*     (2006.01)
    *G02F 1/13*     (2006.01)
    *G02F 1/1337*     (2006.01)

(52) U.S. Cl.
    CPC .............. *B08B 5/00* (2013.01); *B08B 7/0057* (2013.01); *B08B 7/028* (2013.01); *B08B 5/02* (2013.01); *B08B 15/007* (2013.01); *G02F 1/133788* (2013.01); *G02F 2001/1316* (2013.01)

(58) Field of Classification Search
    CPC ..... B08B 7/028; B08B 15/007; G02F 1/1303; G02F 1/133788; G02F 2001/1316
    USPC .......................................... 134/104.2; 445/63
    See application file for complete search history.

(56) References Cited

FOREIGN PATENT DOCUMENTS

| | | |
|---|---|---|
| CN | 203299496 U | 11/2013 |
| JP | 2004078244 A | 3/2004 |
| JP | 2008270284 A | 11/2008 |
| KR | 20100001852 A | 1/2010 |
| KR | 101232902 B1 | 2/2013 |

\* cited by examiner

LIQUID CRYSTAL PHOTO-ALIGNMENT DEVICE

FIELD OF THE INVENTION

The present invention relates to liquid crystal display (LCD) panel manufacturing technologies, and particularly, to a liquid crystal photo-alignment device capable of automatic cleaning a platform thereof.

BACKGROUND OF THE INVENTION

Due to many excellent performance characteristics, such as thin body and low power consumption, LCDs are extensively used in a variety of electronic devices. Generally, most of LCDs are back-light type. The LCD includes a LCD panel and a backlight module. Liquid crystal molecules are set between two glass substrates, and change their directions by means of controlling the glass substrates to be charged or not. The LCD panel refracts light emitting from the backlight module to show an image.

Liquid crystal photo-alignment technology is very important for manufacturing LCD panel. The image quality of the LCD is associated with the quality of the liquid crystal photo-alignment. The LCD shows a high quality image only if the liquid crystal molecules in LCD panel are arranged stable and uniform. Generally, an alignment film is used to make directional alignment of the liquid crystal molecules, and a liquid crystal photo-alignment device is used in the liquid crystal photo-alignment technology. In particular, when the glass substrate is applied to a voltage, a LC pretilt angle is formed on a surface of the alignment film in a manner that ultraviolet radiation impinges on the monomer in the liquid crystal molecules to make their reaction to form fit, thereby achieving the function of liquid crystal photo-alignment. In order to accelerate the reaction, a platform of the liquid crystal photo-alignment device, which is configured for supporting the glass substrates, needs to be heated to a certain temperature, average of 40~50° C. In order to form a certain alignment angle under the ultraviolet radiation, the entire supporting surface of the platform must keep the same temperature, and error needs to be controlled within ±3°. However, particles in air, abrasion debris, or other foreign objects are easily fallen on the platform when placing the glass substrates on the platform. If the dimension of the foreign objects is larger than 1 mm*1 mm, the temperature of the area having the foreign objects will be very different from that of the other area of the platform. Furthermore, the foreign objects can influence the reflection and refraction of the ultraviolet radiation, and cause an abnormal photo-alignment of the area having the foreign objects. This decreases the product yield. Thus, the platform needs operators to do regularly manual cleaning.

Therefore, it is desired to provide a liquid crystal photo-alignment device, which can overcome or at least alleviate the above-mentioned problem.

SUMMARY OF THE INVENTION

To solve the above-mentioned problem, the present invention provides a liquid crystal photo-alignment device. The liquid crystal photo-alignment device includes two parallel guide rails, a platform sandwiched between the two guide rails, a support assembly slidably mounted on the two guide rails, and a cleaning assembly mounted to the support assembly. The platform has a supporting surface for supporting a LCD panel. Each support assembly includes a supporting beam across the platform, two supporting arms extending from opposite ends of the supporting beam, and two sliders connected to the respective supporting arms. The sliders are slidably mounted in the guide rails. The cleaning assembly faces toward the platform and is configured to clean up foreign objects on the platform.

Wherein, each guide rail is a frame and comprises an inner side surface defining a groove, the two grooves of the two guide rails face toward each other, and opposite sides of the platform engage in the respective grooves.

Wherein, the liquid crystal photo-alignment device further comprises two driving assemblies corresponding to the two sliders and the two guide rails, each driving assembly comprises a motor and a transmission screw, the motor is fixed to an outer surface of one end of the corresponding guide rail, the transmission screw is located in the corresponding guide rail, one end of the transmission screw is fixed to the motor, the other end of the transmission screw is rotatably mounted to the other end of the corresponding guide rail, and the transmission screw passes through the corresponding slider and screws with the corresponding slider.

Wherein, each guide rail comprises a top surface and a bottom surface opposite to the top surface, the inner side surface is interconnected between the top surface and the bottom surface, each guide rail defines a guide hole passing through the top surface and the bottom surface, each slider is substantially T-shaped and comprises a connection portion and a fixing portion, the connection portion is supported by the top surface, and the fixing portion is slidably assembled in the guide hole.

Wherein, the fixing portion of each slider defines a threaded hole, and each transmission screw passes through the corresponding slider and engages in the threaded hole of the corresponding slider.

Wherein, each support assembly comprises a plurality of adjusting screws, one end of each adjusting screw engages with the supporting beam, and the other end of each adjusting screw is connected to the cleaning assembly.

Wherein, the cleaning assembly is a brush, the brush is fixed to the supporting beam through the adjusting screw, and a distance between the brush and the platform is capable of being adjusted through driving the adjusting screw, and the brush faces toward the platform.

Wherein, the brush is made of wear-resisting material and comprises a plurality of bristles, and the diameter of each bristle is less than or equals to 0.5 millimeters.

Wherein, the brush is made of anti-static material.

Wherein, the liquid crystal photo-alignment device further comprises an electrostatic eliminator, the electrostatic eliminator is fixedly mounted on the supporting beam and faces toward the platform.

Wherein, the supporting beam comprises an upper surface and a lower surface, the lower surface faces toward the supporting surface, the brush is fixed to the supporting beam through the adjusting screw, and a distance between the brush and the supporting surface is capable of being adjusted through driving the adjusting screw, and the electrostatic eliminator is fixed to the upper surface.

Wherein, the liquid crystal photo-alignment device further comprises a plurality of ultraviolet sources, the ultraviolet sources are fixed to the lower surface and faces toward the supporting surface, and the ultraviolet sources are configured to radiate ultraviolet light toward the LCD panel supported by the supporting surface.

Wherein, the liquid crystal photo-alignment device further comprises an illumination photometer, the illumination photometer is fixed to the upper surface and faces toward the supporting surface, and the illumination photometer is configured to detect the intensity of illumination of the ultraviolet light emitting from the ultraviolet sources.

Wherein, the cleaning assembly comprises a pressure portion, two vacuum portions at opposite sides of the pressure portion, and two ultrasonic generators positioned inside the pressure portion, an opening of the pressure portion and an opening of each vacuum portion face toward and are spaced apart from the platform, the pressure portion is configured to blow air to the platform, the two ultrasonic generators are configured to produce vibration to shock the foreign objects on the platform, and the two vacuum portions are configured to receive the shocked foreign objects.

Wherein, the liquid crystal photo-alignment device further comprises an electrostatic eliminator, the supporting beam comprises an upper surface and a lower surface, the lower surface faces toward the supporting surface, the cleaning assembly is fixed to the lower surface through the adjusting screw, a distance between the cleaning assembly and the supporting surface is capable of being adjusted through driving the adjusting screw, and the electrostatic eliminator is fixed to the upper surface and face toward the platform.

Wherein, the liquid crystal photo-alignment device further comprises a plurality of ultraviolet sources, the ultraviolet sources are fixed to the lower surface and faces toward the supporting surface, and the ultraviolet sources are configured to radiate ultraviolet light toward the LCD panel supported by the supporting surface.

Wherein, the liquid crystal photo-alignment device further comprises an illumination photometer, the illumination photometer is fixed to the upper surface and faces toward the supporting surface, and the illumination photometer is configured to detect the intensity of illumination of the ultraviolet light emitting from the ultraviolet sources.

Wherein, the cleaning assembly comprises a vacuum portion, two pressure portions at opposite sides of the vacuum portion, and two ultrasonic generators positioned inside the two pressure portions, an opening of each pressure portion and an opening of the vacuum portion face toward and are spaced apart from the platform, the two pressure portions are configured to blow air to the platform, the two ultrasonic generators are configured to produce vibration to shock the foreign objects on the platform, and the vacuum portion is configured to receive the shocked foreign objects.

Wherein, the liquid crystal photo-alignment device further comprises an electrostatic eliminator, the supporting beam comprises an upper surface and a lower surface, the lower surface faces toward the supporting surface, the cleaning assembly is fixed to the lower surface through the adjusting screw, a distance between the cleaning assembly and the supporting surface is capable of being adjusted through driving the adjusting screw, and the electrostatic eliminator is fixed to the upper surface and face toward the platform.

Wherein, the liquid crystal photo-alignment device further comprises a plurality of ultraviolet sources and an illumination photometer, the ultraviolet sources are fixed to the lower surface and faces toward the supporting surface, the ultraviolet sources are configured to radiate ultraviolet light toward the LCD panel supported by the supporting surface, the illumination photometer is fixed to the upper surface and faces toward the supporting surface, and the illumination photometer is configured to detect the intensity of illumination of the ultraviolet light emitting from the ultraviolet sources.

In the liquid crystal photo-alignment device, the cleaning assembly faces toward the supporting surface and moves with movement of the support assembly, thereby eliminating all of the foreign objects on the supporting surface. Automatically movement of the cleaning assembly by the driving assemblies reduce money and effort.

BRIEF DESCRIPTION OF THE DRAWINGS

In order to illustrate technical schemes of the present invention or the prior art more clearly, the following section briefly introduces drawings used to describe the embodiments and prior art. Obviously, the drawing in the following descriptions just is some embodiments of the present invention. The ordinary person in the related art can acquire the other drawings according to these drawings without offering creative effort.

DETAILED DESCRIPTION OF THE PREFERRED EMBODIMENTS

The following sections offer a clear, complete description of the present invention in combination with the embodiments and accompanying drawings. Obviously, the embodiments described herein are only a part of, but not all of the embodiments of the present invention. In view of the embodiments described herein, any other embodiment obtained by the person skilled in the field without offering creative effort is included in a scope claimed by the present invention.

The First Embodiment

Figure 1:
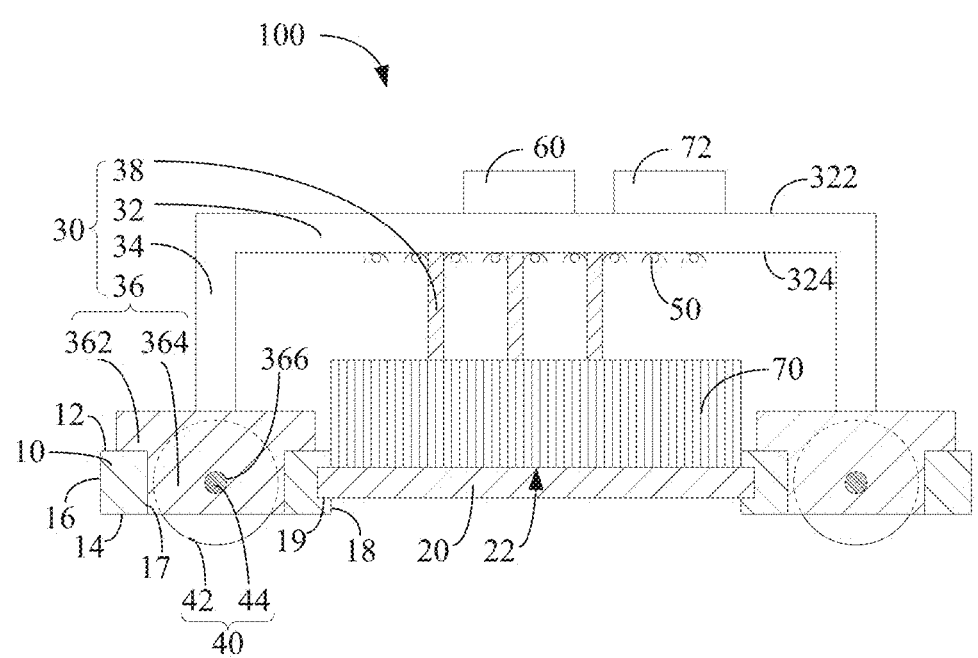
FIG. 1 is a partial cross-sectional view of a liquid crystal photo-alignment device in accordance with a first exemplary embodiment of the present invention.

Referring to FIG. 1, a liquid crystal photo-alignment device 100, in accordance with a first embodiment, includes two guide rails 10, a platform 20, a support assembly 30, two driving assemblies 40, and a number of ultraviolet sources 50, an illumination photometer 60, a cleaning assembly 70, and an electrostatic eliminator 72.

The two guide rails 10 are substantially parallel to each other. Each of the guide rails 10 is substantially a rectangular frame, and includes a top surface 12, a bottom surface 14, an outer side surface 16, and an inner side surface 18. The top surface 12 and the bottom surface 14 are located at opposite sides of the guide rail 10, and the top surface 12 is substantially parallel to the bottom surface 14. The outer side surface 16 and the inner side surface 18 are located at opposite sides of the guide rail 10, and the outer side surface 16 is substantially parallel to the inner side surface 18. The outer side surface 16 is substantially perpendicularly interconnected between the top surface 12 and the bottom surface 14. The inner side surface 18 is substantially perpendicularly interconnected between the top surface 12 and the bottom surface 14. Each guide rail 10 defines a guide hole 17 passing through the top surface 12 and the bottom surface 14. The inner side surface 18 defines a long strip of groove 19. The two inner side surfaces 18 of the two guide rails 10 face toward each other, and the two grooves 19 face toward each other.

The platform 20 is sandwiched between the two guide rails 10. In detail, opposite sides of the platform 20 engage in the two grooves 19, respectively. In this embodiment, the platform 20 is configured to support a LCD panel (not shown), which needs a liquid crystal photo-alignment process. The platform 20 includes a supporting surface 22.

The support assembly 30 includes a supporting beam 32, two supporting arms 34, two sliders 36, and three adjusting screws 38. The supporting beam 32 spans the platform 20. The supporting beam 32 includes an upper surface 322 and a lower surface 324 opposite to the upper surface 322. The lower surface 324 faces toward the supporting surface 22. The two supporting arms 34 perpendicularly extend from opposite ends of the supporting beam 32. The two sliders 36 correspond to the two supporting arms 34, and correspond to the two guide rails 10. Each slider 36 is substantially T-shaped, and includes a connection portion 362 and a fixing portion 364 perpendicular extending from the connection portion 362. The connection portion 362 is supported by the top surface 12. The fixing portion 364 is slidably assembled in the guide hole 17 of the guide rail 10. The fixing portion 364 defines a threaded hole 366. An end of each supporting arm 34 opposite to the supporting beam 32 is fixedly connected to the slider 36. One end of each adjusting screw 38 is screwed with the lower surface 324 of the supporting beam 32.

The two driving assemblies 40 correspond to the two guide rails 10, and correspond to the two sliders 36. Each driving assembly 40 includes a motor 42 and a transmission screw 44. The motor 42 is fixed to an outer surface of one end of the corresponding guide rail 10. The transmission screw 44 is located in the corresponding guide rail 10. One end of the transmission screw 44 is fixed to the motor 42, and the other end of the transmission screw 44 is rotatably mounted to the other end of the corresponding guide rail 10. The transmission screw 44 passes through the corresponding slider 36, and engages in a threaded hole 366 of the slider 36.

The ultraviolet sources 50 are fixedly mounted to the lower surface 324 and face toward the supporting surface 22. The ultraviolet sources 50 are substantially parallel to each other, and are configured to radiate ultraviolet light toward the LCD panel supported by the supporting surface 22.

The illumination photometer 60 is mounted on the upper surface 322 and aligns with the supporting surface 22. The illumination photometer 60 is configured to detect the intensity of illumination of the ultraviolet light emitting from the ultraviolet sources 50.

The cleaning assembly 70 is a brush. One end of the brush 70 is fixed to the other end of each adjusting screw 38, and the other end of the brush 70 aligns with the supporting surface 22. That is, the brush 70 is fixed to the supporting beam 32, and a distance between the brush 70 and the supporting surface 22 can be adjusted through driving the adjusting screw 38. In this embodiment, the brush 70 is made of wear-resisting material and includes a number of bristles. The diameter of each bristle is less than or equals to 0.5 millimeters.

The electrostatic eliminator 72 is fixedly mounted on the upper surface 322 and is spaced apart from the illumination photometer 60. The electrostatic eliminator 72 faces toward the supporting surface 22, and is configured to blow positive and negative ions to eliminate the static electricity on the brush 70 and the supporting surface 22.

Figure 2:
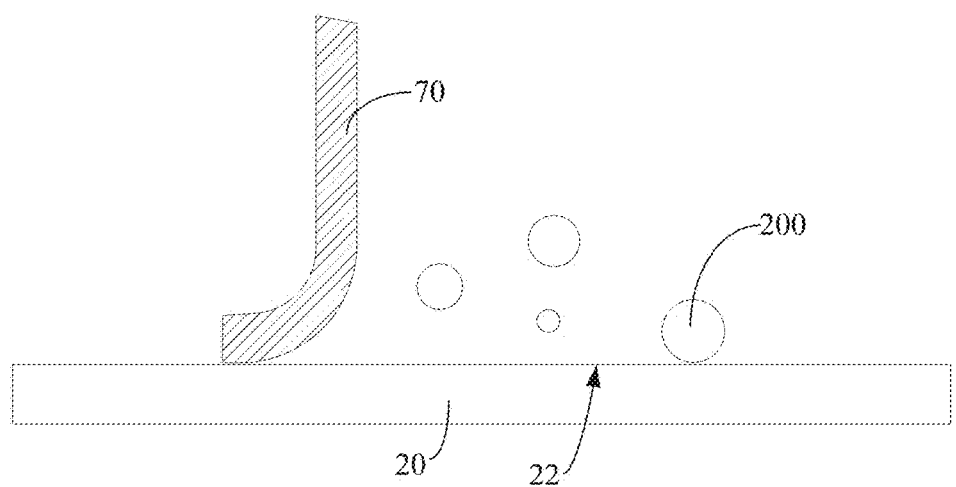
FIG. 2 is a schematic view, showing the working principle of the liquid crystal photo-alignment device of FIG. 1.

In an initial state, the brush 70 does not contact the supporting surface 22, and a gap is formed between the brush 70 and the supporting surface 22. Before the liquid crystal photo-alignment process for the LCD panel on the supporting surface 22 using the liquid crystal photo-alignment device 100, the supporting surface 22 is needed to be clean up. Referring to FIGS. 1-2, eliminating foreign objects 200, such as particles in air or abrasion debris, includes the following steps. First, the screw depth between the adjusting screw 38 and the supporting beam 32 is adjusted until the brush 70 entirely contacts the supporting surface 22. Second, the two motor 42 drives the two transmission screws 44 to rotate. Because the transmission screws 44 engages in the two threaded holes 366, and the guide rails 10 restrict the two sliders 36, the two sliders 36 moves along the two guide rails 10 with the rotation of the transmission screws 44, and the brush 70 with the supporting beam 32 moves along the two guide rails 10. Thus, the brush 70 eliminates all of the foreign objects 200 during moving along the guide rails 10. During the moving process, the electrostatic eliminator 72 blows positive and negative ions toward the supporting surface 22. The positive and negative ions from the electrostatic eliminator 72 neutralize with positive and negative ions on the supporting surface 22 to eliminate the static electricity on the brush 70 and the supporting surface 22.

The movement direction of the brush 70 depends on the rotation direction of the motor 42, and the rotation direction of the motor 42 depends on a current applied to the motor 42. For example, when a positive current applied to the motor 42 makes a clockwise rotation of the motor 42, the transmission screw 44 also rotates clockwise, and the slider 36 moves toward the motor 42 along the guide rail 10. When a negative current applied to the motor 42 makes a counter-clockwise rotation of the motor 42, the transmission screw 44 also rotates counter-clockwise, and the slider 36 moves away the motor 42 along the guide rail 10. Thus, the brush 70 moves back and forth to eliminate the foreign objects 200. After eliminating all of the foreign objects 200, the screw depth between the adjusting screw 38 and the supporting beam 32 is adjusted until the brush 70 does not contact the supporting surface 22. That is, the brush 70 goes back the initial position by adjusting the adjusting screw 38, and the LCD panel can be placed on the supporting surface 22 to do the liquid crystal photo-alignment process.

In the liquid crystal photo-alignment device 100 of this embodiment, the brush 70 and the illumination photometer 60 are mounted on the supporting beam 32, and the cleaning assembly (brush) 70 contacts the supporting surface 22. The brush 70 moves along the two guide rails 10 by means of moving the supporting beam 32, thereby eliminating all of the foreign objects 200 on the supporting surface 22. Automatically movement of the cleaning assembly 70 by the driving assemblies 40 reduce money and effort.

It is understood that the adjusting screws 38 are not limited to be three, may be at least two, such as two, four, or five. In the other embodiments, the cleaning assembly 70 can be made of wear-resisting and anti-static material. In this situation, the electrostatic eliminator 72 can be omitted. This can simplify the structure of the liquid crystal photo-alignment device 100 and save money.

The Second Embodiment

Figure 3:
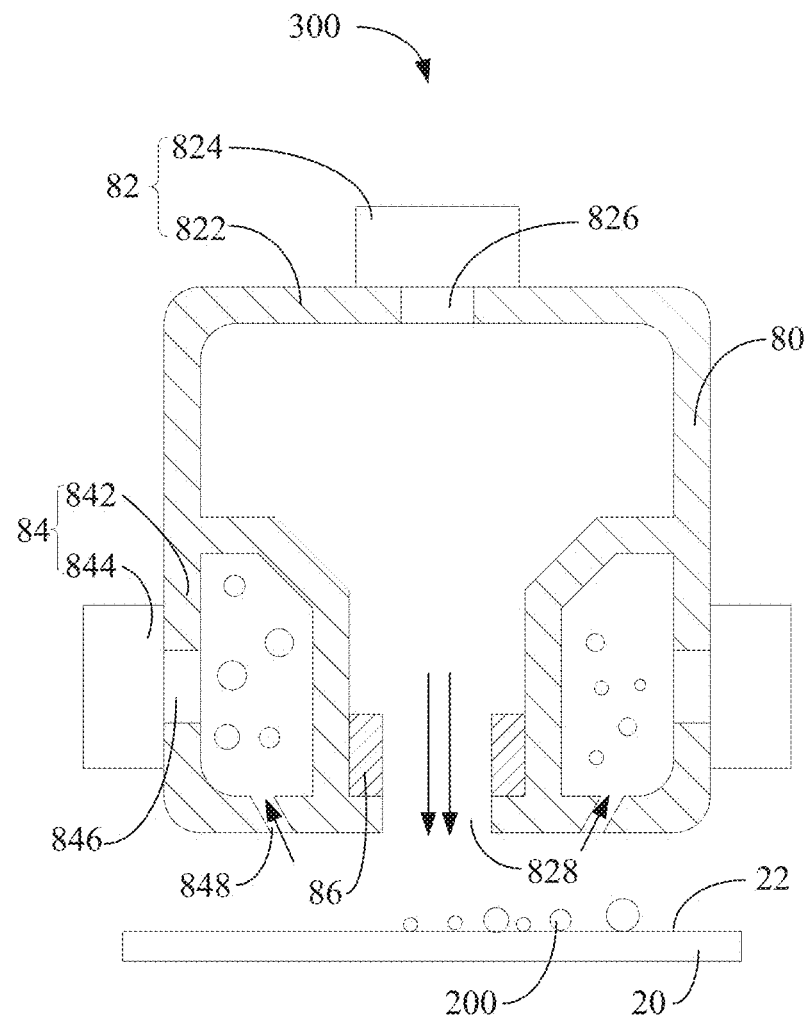
FIG. 3 is a cross-sectional view of a cleaning assembly of a liquid crystal photo-alignment device in accordance with a second exemplary embodiment of the present invention.

Referring to FIG. 1 and FIG. 3, the structure of the liquid crystal photo-alignment device 300 of the second embodiment is slimier to that of the liquid crystal photo-alignment device 100 of the first embodiment. The difference between the liquid crystal photo-alignment device 300 and the liquid crystal photo-alignment device 100 is that the cleaning assembly 80 is not a brush. Instead, the cleaning assembly 80 includes a pressure portion 82, two vacuum portions 84 at opposite sides of the pressure portion 82, and two ultrasonic generators 86 positioned inside the pressure portion 82.

The pressure portion 82 includes a pressure chamber 822 and a blower 824 positioned outside the pressure chamber 822. Each vacuum portion 84 includes a vacuum chamber 842 and a vacuum pump 844 positioned outside the vacuum chamber 842. The two vacuum chambers 842 are located at opposite sides of the pressure chamber 822 and are separated from each other by the pressure chamber 822. The two vacuum chambers 842 and the pressure chamber 822 cooperatively form a rectangular chamber. The pressure chamber 822 defines a first through hole 826 at an end thereof nearby the supporting beam (not shown), and a first opening 828 at an opposing end thereof nearby the supporting surface 22. Each vacuum chamber 842 defines a second through hole 846 at a side thereof opposite to the pressure chamber 822, and a second opening 848 at an end thereof nearby the supporting surface 22. The first opening 828 and the second openings 848 face toward and are spaced apart from the supporting surface 22. The blower 824 is in communication with the pressure chamber 822 through the first through hole 826. Each vacuum pump 844 is communication with the corresponding vacuum chamber 842 through the corresponding second through hole 846. The blower 824 blows air toward the pressure chamber 822, and the air passes through the pressure chamber 822 and reaches the supporting surface 22 through the first opening 828. Air in each vacuum chamber 842 is exhausted by the corresponding vacuum pump 844 through the second through hole 846, thereby making each vacuum chamber 842 be a similar vacuum environment.

The two ultrasonic generators 86 are located in the pressure chamber 822 nearby the first opening 828, and are configured to produce vibration to shock the foreign objects 200 on the supporting surface 22.

When the cleaning assembly 80 moves back and forth to eliminate the foreign objects 200, air in each vacuum chamber 842 is exhausted by the corresponding vacuum pump 844 through the second through hole 846, thereby making each vacuum chamber 842 be in a similar vacuum environment. Meanwhile, the two ultrasonic generators 86 and the blower 824 are powered on. In other words, the two ultrasonic generators 86 produce vibration to shock the foreign objects 200 on the supporting surface 22. Air blowing from the blower 824 first passes through the first opening 828, and then blows the shocked foreign objects 200 into the two vacuum chambers 842 through the two second openings 848 due to an air pressure difference. The foreign objects 200 are received in the two vacuum chambers 842, thereby eliminating the foreign objects 200 on the supporting surface 22.

The movement principle of the cleaning assembly 80 of this embodiment is the same as that of the cleaning assembly 70 of the first embodiment. The advantage of the cleaning assembly 80 of this embodiment is the same as that of the cleaning assembly 70 of the first embodiment. Furthermore, the cleaning assembly 80 can eliminate the foreign objects 200 with minimum size of 1.6 micrometers and does not contact the supporting surface 22 during the cleaning process. It not only has a better cleaning effect, but also can avoid destroying the platform 20.

The Third Embodiment

Figure 4:
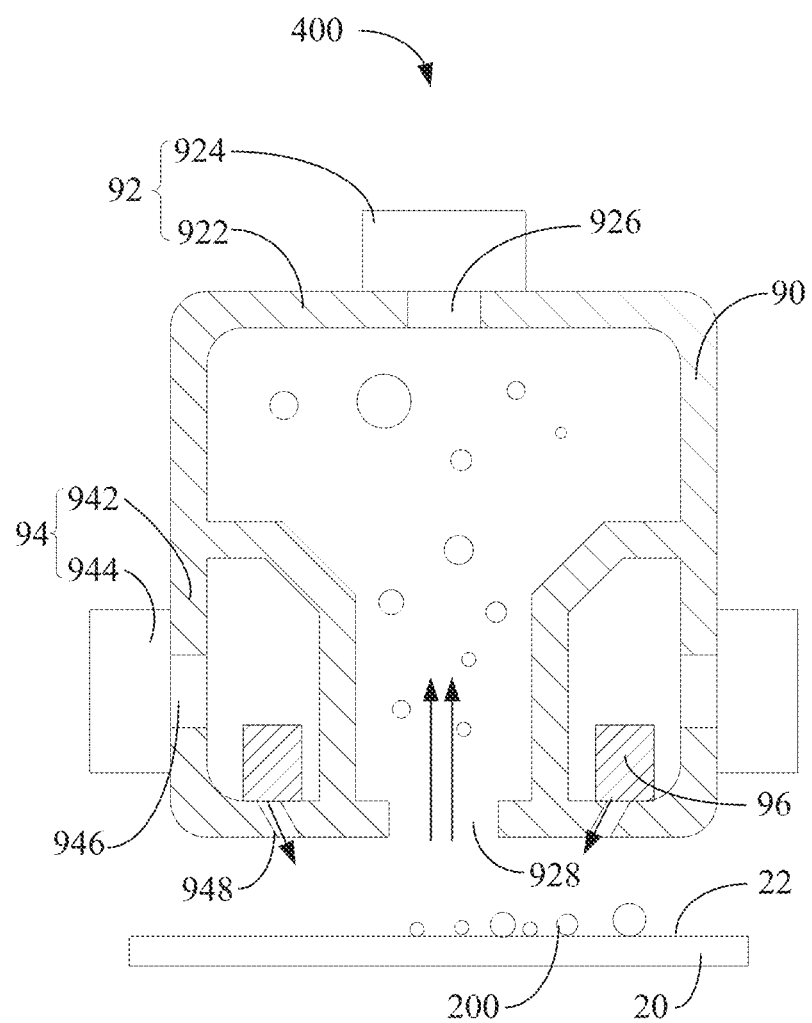
FIG. 4 is a cross-sectional view of a cleaning assembly of a liquid crystal photo-alignment device in accordance with a third exemplary embodiment of the present invention.

Referring to FIG. 1 and FIG. 4, the structure of the liquid crystal photo-alignment device 400 of the third embodiment is similar to that of the liquid crystal photo-alignment device 100 of the first embodiment. The difference between the liquid crystal photo-alignment device 400 and the liquid crystal photo-alignment device 100 is that the cleaning assembly 90 is not a brush. Instead, the cleaning assembly 90 includes a vacuum portion 92, two pressure portions 94 at opposite sides of the vacuum portion 92, and two ultrasonic generators 96 positioned inside the two pressure portions 94.

The vacuum portion 92 includes a vacuum chamber 922 and a vacuum pump 924 positioned outside the vacuum chamber 922. Each pressure portion 94 includes a pressure chamber 942 and a blower 944 positioned outside the pressure chamber 942. The two pressure chambers 942 are located at opposite sides of the vacuum chamber 922 and are separated from each other by the vacuum chamber 922. The two pressure chambers 942 and the vacuum chamber 922 cooperatively form a rectangular chamber. The vacuum chamber 922 defines a first through hole 926 at an end thereof nearby the supporting beam (not shown), and a first opening 928 at an opposing end thereof nearby the supporting surface 22. Each pressure chamber 942 defines a second through hole 946 at a side thereof opposite to the pressure chamber 922, and a second opening 948 at an end thereof nearby the supporting surface 22. The first opening 928 and the second openings 948 face toward and are spaced apart from the supporting surface 22. The vacuum pump 924 is in communication with the vacuum chamber 922 through the first through hole 926. Each blower 944 is communication with the corresponding pressure chamber 942 through the corresponding second through hole 946. The vacuum pump 924 exhausts air in the vacuum chamber 922 to make the vacuum chamber 922 be in a similar vacuum environment. Each blower 944 blows air toward the pressure chamber 942, and the air passes through the corresponding pressure chamber 942 and reaches the supporting surface 22 through the corresponding second opening 948.

The two ultrasonic generators 96 are located in the two pressure chambers 942 nearby the two second openings 948, and are configured to produce vibration to shock the foreign objects 200 on the supporting surface 22.

When the cleaning assembly 90 moves back and forth to eliminate the foreign objects 200, air in the vacuum chamber 922 is exhausted by the vacuum pump 924 through the first through hole 926, thereby making vacuum chamber 922 be in a similar vacuum environment. Meanwhile, the two ultrasonic generators 96 and the blower 944 are powered on. In other words, the two ultrasonic generators 96 produce vibration to shock the foreign objects 200 on the supporting surface 22. Air blowing from the blower 944 first passes through the corresponding second opening 948, and then blows the shocked foreign objects 200 into the vacuum chamber 922 through the first opening 928 due to an air pressure difference. The foreign objects 200 are received in the vacuum chamber 922, thereby eliminating the foreign objects 200 on the supporting surface 22.

The movement principle of the cleaning assembly 90 of the third embodiment is the same as that of the cleaning assembly 70 of the first embodiment. The advantage of the cleaning assembly 90 of this embodiment is the same as that of the cleaning assembly 70 of the first embodiment. Furthermore, the cleaning assembly 90 can eliminate the foreign objects 200 with minimum size of 3 micrometers and does not contact the supporting surface 22 during the cleaning process. It not only has a better cleaning effect, but also can avoid destroying the platform 20.

What is said above are only preferred examples of present invention, not intended to limit the present invention, any modifications, equivalent substitutions and improvements etc. made within the spirit and principle of the present invention, should be included in the protection range of the present invention.

What is claimed is:

1. A liquid crystal photo-alignment device comprising:
two guide rails substantially parallel to each other;
a platform sandwiched between the two guide rails and having a supporting surface configured to support a LCD panel;
a support assembly slidably mounted on the two guide rails, the support assembly comprising a supporting beam across the platform, two supporting arms extending from opposite ends of the supporting beam, and two sliders connected to the respective supporting arms, the sliders slidably mounted in the guide rails; and
a cleaning assembly mounted to the support assembly and facing toward the platform, and the cleaning assembly configured to clean up foreign objects on the platform, wherein each guide rail is a frame and comprises an inner side surface defining a groove, the two grooves of the two guide rails face toward each other, and opposite sides of the platform engage in the respective grooves;
two driving assemblies corresponding to the two sliders and the two guide rails, wherein each driving assembly comprises a motor and a transmission screw, the motor is fixed to an outer surface of one end of the corresponding guide rail, the transmission screw is located in the corresponding guide rail, one end of the transmission screw is fixed to the motor, the other end of the transmission screw is rotatably mounted to the other end of the corresponding guide rail, and the transmission screw passes through the corresponding slider and screws with the corresponding slider; wherein each support assembly comprises a plurality of adjusting screws, one end of each adjusting screw engages with the supporting beam, and the other end of each adjusting screw is connected to the cleaning assembly, wherein the cleaning assembly is a brush, the brush is fixed to the supporting beam through the adjusting screw, and a distance between the brush and the platform is capable of being adjusted through driving the adjusting screw, and the brush faces toward the platform.

2. The liquid crystal photo-alignment device of claim 1, wherein each guide rail comprises a top surface and a bottom surface opposite to the top surface, the inner side surface is interconnected between the top surface and the bottom surface, each guide rail defines a guide hole passing through the top surface and the bottom surface, each slider is substantially T-shaped and comprises a connection portion and a fixing portion, the connection portion is supported by the top surface, and the fixing portion is slidably assembled in the guide hole.

3. The liquid crystal photo-alignment device of claim 2, wherein the fixing portion of each slider defines a threaded hole, and each transmission screw passes through the corresponding slider and engages in the threaded hole of the corresponding slider.

4. The liquid crystal photo-alignment device of claim 1, wherein the brush is made of wear-resisting material and comprises a plurality of bristles, and the diameter of each bristle is less than or equals to 0.5 millimeters.

5. The liquid crystal photo-alignment device of claim 4, wherein the brush is made of anti-static material.

6. The liquid crystal photo-alignment device of claim 1, further comprising an electrostatic eliminator, wherein the electrostatic eliminator is fixedly mounted on the supporting beam and faces toward the platform.

7. The liquid crystal photo-alignment device of claim 6, wherein the supporting beam comprises an upper surface and a lower surface, the lower surface faces toward the supporting surface, the brush is fixed to the supporting beam through the adjusting screw, and a distance between the brush and the supporting surface is capable of being adjusted through driving the adjusting screw, and the electrostatic eliminator is fixed to the upper surface.

8. The liquid crystal photo-alignment device of claim 7, further comprising a plurality of ultraviolet sources, wherein the ultraviolet sources are fixed to the lower surface and faces toward the supporting surface, and the ultraviolet sources are configured to radiate ultraviolet light toward the LCD panel supported by the supporting surface.

9. The liquid crystal photo-alignment device of claim 8, further comprising an illumination photometer, wherein the illumination photometer is fixed to the upper surface and faces toward the supporting surface, and the illumination photometer is configured to detect the intensity of illumination of the ultraviolet light emitting from the ultraviolet sources.

10. The liquid crystal photo-alignment device of claim 1, wherein the cleaning assembly comprises a pressure portion, two vacuum portions at opposite sides of the pressure portion, and two ultrasonic generators positioned inside the pressure portion, an opening of the pressure portion and an opening of each vacuum portion face toward and are spaced apart from the platform, the pressure portion is configured to blow air to the platform, the two ultrasonic generators are configured to produce vibration to shock the foreign objects on the platform, and the two vacuum portions are configured to receive the shocked foreign objects.

11. The liquid crystal photo-alignment device of claim 10, further comprising an electrostatic eliminator, wherein the supporting beam comprises an upper surface and a lower surface, the lower surface faces toward the supporting surface, the cleaning assembly is fixed to the lower surface through the adjusting screw, a distance between the cleaning assembly and the supporting surface is capable of being adjusted through driving the adjusting screw, and the electrostatic eliminator is fixed to the upper surface and face toward the platform.

12. The liquid crystal photo-alignment device of claim 11, further comprising a plurality of ultraviolet sources, wherein the ultraviolet sources are fixed to the lower surface and faces toward the supporting surface, and the ultraviolet sources are configured to radiate ultraviolet light toward the LCD panel supported by the supporting surface.

13. The liquid crystal photo-alignment device of claim 12, further comprising an illumination photometer, wherein the illumination photometer is fixed to the upper surface and faces toward the supporting surface, and the illumination photometer is configured to detect the intensity of illumination of the ultraviolet light emitting from the ultraviolet sources.

14. The liquid crystal photo-alignment device of claim 1, wherein the cleaning assembly comprises a vacuum portion, two pressure portions at opposite sides of the vacuum portion, and two ultrasonic generators positioned inside the two pressure portions, an opening of each pressure portion and an opening of the vacuum portion face toward and are spaced apart from the platform, the two pressure portions are configured to blow air to the platform, the two ultrasonic generators are configured to produce vibration to shock the foreign objects on the platform, and the vacuum portion is configured to receive the shocked foreign objects.

15. The liquid crystal photo-alignment device of claim 14, further comprising an electrostatic eliminator, wherein the supporting beam comprises an upper surface and a lower surface, the lower surface faces toward the supporting surface, the cleaning assembly is fixed to the lower surface through the adjusting screw, a distance between the cleaning assembly and the supporting surface is capable of being adjusted through driving the adjusting screw, and the electrostatic eliminator is fixed to the upper surface and face toward the platform.

16. The liquid crystal photo-alignment device of claim 15, further comprising a plurality of ultraviolet sources and an illumination photometer, wherein the ultraviolet sources are fixed to the lower surface and faces toward the supporting surface, the ultraviolet sources are configured to radiate ultraviolet light toward the LCD panel supported by the supporting surface, the illumination photometer is fixed to the upper surface and faces toward the supporting surface, and the illumination photometer is configured to detect the intensity of illumination of the ultraviolet light emitting from the ultraviolet sources.

* * * * *